United States Patent [19]

Ono

[11] 4,150,262
[45] Apr. 17, 1979

[54] PIEZOELECTRIC BONE CONDUCTIVE IN EAR VOICE SOUNDS TRANSMITTING AND RECEIVING APPARATUS

[76] Inventor: Hiroshi Ono, No. 10-15, Koyama 7-chome, Shinagawa-ku, Tokyo, Japan

[21] Appl. No.: 789,606

[22] Filed: Apr. 21, 1977

Related U.S. Application Data

[63] Continuation of Ser. No. 632,945, Nov. 18, 1975, abandoned.

[30] Foreign Application Priority Data

Nov. 18, 1974 [JP] Japan .................................. 49-131959
Jan. 27, 1975 [JP] Japan .......................... 50-11452[U]
Feb. 17, 1975 [JP] Japan .................................. 50-18906
Mar. 19, 1975 [JP] Japan .......................... 50-36062[U]
Mar. 22, 1975 [JP] Japan .......................... 50-38589[U]
Mar. 22, 1975 [JP] Japan .......................... 50-38590[U]
May 26, 1975 [JP] Japan .......................... 50-70625[U]
Jul. 2, 1975 [JP] Japan .......................... 50-92612[U]
Jul. 9, 1975 [JP] Japan .......................... 50-95312[U]
Jul. 25, 1975 [JP] Japan ......................... 50-103286[U]
Jul. 25, 1975 [JP] Japan ......................... 50-103287[U]
Sep. 16, 1975 [JP] Japan ......................... 50-127097[U]
Oct. 11, 1975 [JP] Japan ......................... 50-138982[U]
Oct. 11, 1975 [JP] Japan ......................... 50-138983[U]

[51] Int. Cl.² .................. H04R 1/46; H04R 25/02; H04M 1/03
[52] U.S. Cl. .......................... 179/107 BC; 179/102; 179/107 E; 179/121 C
[58] Field of Search ............ 179/102, 107 BC, 107 E, 179/110 A

[56] References Cited

U.S. PATENT DOCUMENTS

| 1,630,028 | 5/1927 | Reynolds | 179/107 BC |
| 2,339,148 | 1/1944 | Carlisle | 179/107 BC |
| 2,339,173 | 1/1944 | Koren | 179/107 BC |
| 2,535,063 | 12/1950 | Halstead | 179/107 E |
| 3,209,082 | 9/1965 | McCarrell et al. | 179/107 |
| 3,408,461 | 10/1968 | Langford | 179/107 E |
| 3,819,860 | 6/1974 | Miller | 179/182 R |

FOREIGN PATENT DOCUMENTS

| 915826 | 7/1954 | Fed. Rep. of Germany | 179/107 BC |
| 550756 | 1/1943 | United Kingdom | 179/121 C |
| 1066299 | 4/1967 | United Kingdom | 179/107 BC |
| 1086723 | 10/1967 | United Kingdom | 179/121 C |

*Primary Examiner*—George G. Stellar
*Attorney, Agent, or Firm*—Frank J. Jordan

[57] ABSTRACT

A voice sound transmitting and receiving apparatus suitable for the use under noisy circumstances and designed to be inserted into the external auditory canal of a user for attaining the voice sound transmitting and receiving operation using the vibrations of the external auditory canal wall.

5 Claims, 35 Drawing Figures

PIEZOELECTRIC BONE CONDUCTIVE IN EAR VOICE SOUNDS TRANSMITTING AND RECEIVING APPARATUS

This is a continuation, of application Ser. No. 632,945, filed Nov. 18, 1975, now abandoned.

The present invention relates to a voice sounds transmitting and receiving apparatus suitable for use under noisy circumstances and having a microphone and a speaker to which a new and useful improvement is added.

For the purpose of transmitting voice sounds at places such as a coal mining site, air port and constructural site, there have been conventionally used a method of using a unidirectional microphone immediately before the lips of a user and a method of attaching a vibration pick-up of the acceleration type to the throat or the forehead of the user. However, the former has such a limitation that the unidirectional microphone can not eliminate environmental noises completely, thus being unsuitable for use under extremely noisy circumstances. On the other hand, the latter makes it necessary to attach the vibration pick-up to the throat or the forehead of the user and the attaching operation is complicated and troublesome. In addition, the user feels discomfort with the pick-up being attached to him, thus resulting in that the user can not wear the pick-up for a long time.

There is also well known a method of using the changes in the sound pressure in the ear canal of the user which occur when he utters voice sounds. However, these conventional methods are carried out by attaching a microphone into his ear and an earphone into his other ear or by carrying in his hand and pressing to one of his ears a device having the microphone and the earphone incorporated therein, thus resulting in such disadvantages that environmental sounds can not reach his ear drum to thereby put him in a dangerous state as his both ears are closed by the earphone and the microphone and his both hands can not be freely used when the hand-carrying device is used.

When the microphone and the earphone arranged to use the changes in the sound pressure in the ear canal are used in these conventional voice sounds transmitting and receiving apparatus of the above-mentioned type, the voice sound generated from the voice sounds receiving system are fed back to the microphone of the voice sound transmitting system, thus causing a so called howling.

Further, these voice sounds transmitting and reciving apparatus arranged to use the changes in the sound pressure in the ear canal have been disadvantageous in that the voice sounds of a low frequency band are emphasized by closing the external auditory canal, thus causing the clarity of the voice sounds to be degraded.

Though the voice sounds having a high clarity can be obtained only by correcting the hearing ability of the user according to the A characteristic or according to the hearing characteristic of the user, there will unavoidably occur the above-mentioned howling phenomenon unless the changeover from voice sounds transmitting operation to voice sounds receiving operation and versa is attained.

The present invention is intended to eliminate the above-mentioned disadvantages inherent to conventional voice sound transmitting and receiving apparatus.

Accordingly, a primary object of the present invention is to provide a voice sound transmitting apparatus through which the voice sound transmitting operation can be attained without being influenced by any environmental noises.

Still further object of the present invention is to provide a voice sound transmitting apparatus which is designed to pick up the voice sound through the external auditory canal wall by means of a vibration pick-up capable of completely eliminating the evironmental noises, which is easily attached to the user, which has a fine appearance, and which gives the user no discomfort when the apparatus is used for a long time.

Still further object of the present invention is to provide a voice sound transmitting apparatus designed to pick up the voice sound of high clarity from the vibrations transmitted through the external auditory canal wall of the user.

A still further object of the present invention is to provide a voice sound transmitting apparatus wherein a vibration pick-up is provided in an earpiece which is inserted into the external auditory canal so as to pick up the voice sounds effectively.

These and other objects of the present invention will be apparent from the following detailed description of embodiments of the present invention with reference to the accompanying drawings.

FIGS. 29 through 31 show a twelfth embodiment of the present invention in which

EMBODIMENT 1

Figure 1:
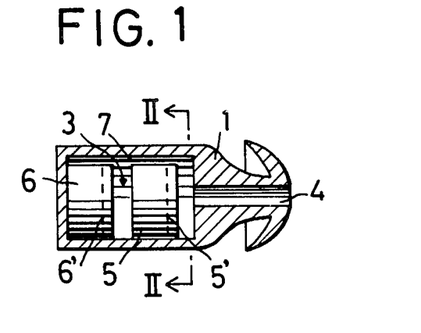
FIG. 1 is a section showing a first embodiment of the present invention.
Figure 2:
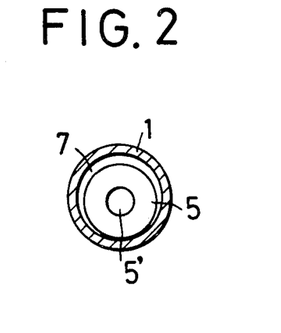
FIG. 2 is a section taken along the line II—II in FIG. 1.

FIGS. 1 and 2 show a typical arrangement of the first embodiment arranged to use the changes in the sound pressure in the ear canal. In FIGS. 1 and 2, numeral 1 represents an earpiece closely inserted into the external auditory canal 2 and numeral 3 a hollow portion provided within the earpiece 1, said hollow portion 3 communicating with the space in the ear canal 2 through an aperture 4 provided in the side of the earpiece 1 facing the ear drum. Numerals 5 and 6 represents super mini-sized a microphone and earphone, respectively, secured in the hollow portion 3 and the vibration diaphrams 5' and 6' thereof are in contact with the air in the canal. The super mini-sized microphones suitable for use in this embodiment are, for example, those of the condenser type and of the electlet condenser type. The microphone and the earphone can be arranged in various ways and it is typical that they are arranged in the hollow portion of the earpiece which is in communication with the air in the ear canal through the aperture. It is not important how they are located with relative to each other in the hollow portion of the earpiece.

Figure 3:
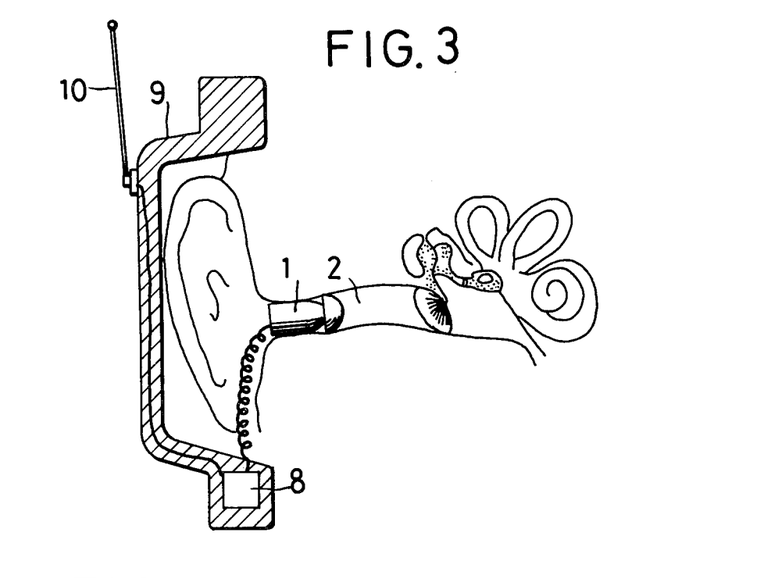
FIG. 3 is a view, partly sectioned, showing how the first embodiment is used.

FIG. 3 shows how the first embodiment is used. In this case an electrical circuit 8 including a transmitting and receiving means may be attached to a soundproofing cover member 9 such as an ear muff which is intended to block the environmental noises, a safety helmet, a cap or the line. When an antenna 10 is used, it may be also attached to the soundproofing cover member 9, the safety helmet, the cap or the like. It is desirable that the earpiece 1 is formed corresponding to the outline of the external auditory canal and to the recess portion of the ear canal, so that the earpiece thus formed will not result in discomfort to the user even if it is used for a long time.

In this embodiment it is possible to obtain the voice sounds of extremely high clarity by attaching an equalizer to the microphone so as to improve hearing ability of the user according to the a characteristic and the voice and characteristic of the user.

The microphone and the earphone of this embodiment are arranged to use the changes in the sound pressure in the ear canal and are fixed in the external auditory canal of an ear. Accordingly, the user can use both his hands freely for any purposes while speaking. Further, the other ear of the user is open to the outside or covered only by the ear muff or the like, so that he can hear any environmental sound thereby avoiding any danger which may occur when both of his ears are enclosed. Furthermore, the microphone and the earphone are arranged in the earpiece which is closely inserted into the external auditory canal so that reduction of the environmental noises to a degree of 20 dB can be expected in the ear canal. Still further, the ear muff or the like can be used integral with the apparatus so that further reduction of the environmental noises to a degree of 20dB can be expected in this case. Therefore, the embodiment is suitable for use under a noisy environment, particularly when both hands of the user are required to do a job under noisy conditions.

There has been conventionally well known a method of transmitting the voice sounds by using the changes in the sound pressure in the ear canal of the user when he utters voice sounds, but the ear microphone used in this case has some problems. One of them relates to its frequency characteristic, another to its principle and the other to the degradation of its sensitivity. Namely, they are that since the ear microphone is intended to pick up the voice sounds transmitted through the bones, its frequency characteristic is limited to the frequency band of 100-2,000 Hz and that the ear microphone functions to emphasize the low frequency components due to the blockage of the external auditery canal so that it is necessary to add a mechanical and electrical correction to the earmicrophone, thereby causing the sensitivity of the microphone to be degraded. This conventional ear microphone is designed to use the changes in the sound pressure in the ear canal of the user and, therefore, the S/N ratio relative to the environmental noises can be enhanced to a degree of about 30 dB when the earmicrophone is used under a normal circumstance. However, the sound pressure in the external auditory canal is about −15 dB in the case of using the earmicrophone and, therefore, the real enhancement of the S/N ratio comes to be about 15 dB, thus making it necessary to eliminate the environmental noises by a different way when this earmicrophone is used under noisy conditions. To add further, the environmental noises normally include frequency components concentrated in the low frequency band.

With regard to the quality of the voice sounds, frequency components which range substantially in a wide frequency band are required in the transmission of natural voice sounds, particularly, those of a range in a high frequency band are essential to the transmission of natural voice sounds having a clarity as regard pronouncing consonants. Accordingly, the ear-microphone having a limitation in its frequency component is not satisfactory.

When the voice sounds are heard by a person who utters them, the frequency components in the low frequency band are almost the sounds transmitted through the bones and the frequecy components in the high frequency band are almost the air conductive sounds uttered through the lips.

Considering the above-mentioned matters. the microphone in the first embodiment of the present invention comprises a combination of the earmicrophone intended for the frequency components in the low frequency band and the well-known lip microphone intended for the frequency components in the high frequency band. Therefore, the enhancement of the S/N ratio relative to the environmental noises as well as the improvement of the quality of the voice sounds can be attained by the first embodiment.

A description has been made mainly to the speaker and the microphone in this first embodiment, but the voice sounds transmitting and receiving apparatus including the speaker and the microphone further includes an electrical circuit, a voice sounds transmitting and receiving means or others. Therefore, it is desirable that the electrical circuit portion and the others are contained in a portable case connected to the microphone through a cord. This can be achieved similarly to the embodiments to be described.

EMBODIMENT 2

Figure 4:
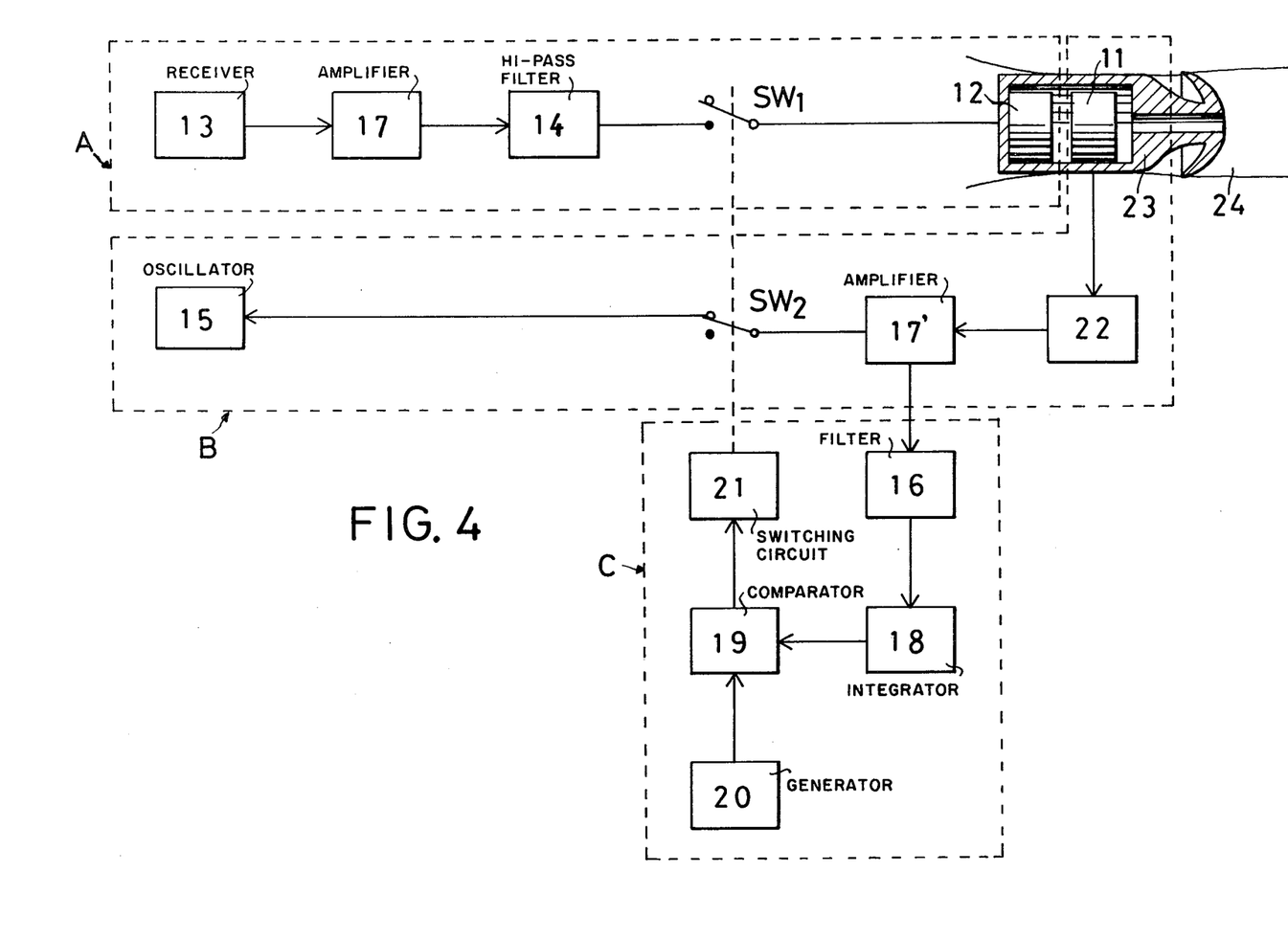
FIG. 4 is a block diagram showing a second embodiment of the present invention.

The second embodiment which will be described with reference to FIG. 4 is intended to obtain voice sounds of high clarity by using the frequency components of the voice sounds in the ear canal.

Generally speaking, the frequency of the voice sounds uttered by a Japanese man ranges in the frequency band of 100–5,000 Hz while for a Japanese woman it is in the frequency band of 180–9,000 Hz. And it is also recognized that this frequency by a Japanese man basically averages in the frequency band of 100–130 Hz and that for a Japanese woman in the frequency band of 180–220 Hz.

Accordingly, in the voice sounds transmitting and receiving apparatus having the microphone and earphone inserted into the ear canal or communicated with the space in the ear canal through a communication pipe, it is arranged so that the output signals from the receiving means are not applied direct to the earphone but rather after they are passed through a high-pass filter so as to remove the frequency components including the basically average ones lower than a specific one (for example, 300 Hz). As a result the frequency components of the voice signals applied, as inputs, to the microphone and lower than the specific one contain only the voice sounds uttered by the user. Thus, it may be arranged that the output signals from the microphone are passed through the band-pass filter, which allows only the voice sounds having the frequency components (for example, 100–250 Hz) lower than the specific one to pass therethrough, to be applied, as input signals, to an automatic changeover switch capable of rendering the transmitting and the receiving systems in "On" and "OFF" states and that the outputs from the microphone are introduced to the transmitting means without passing through the band-pass filter at the time when the transmitting system is operated.

In FIG. 4, numeral 11 denotes a microphone of the condenser type which is flat in the frequency band of 50–10,000 Hz and 12 an earphone arranged intergral with the microphone 11 in an earpiece 23 and communicating with the air in the ear canal. Numeral 13 represents a receiving means whose output is amplified by an amplifyer 17 and applied to the earphone 12 through a high-pass filter 14, which allows the voice signals only in the frequency band of 300–5,000 Hz to pass therethrough, and a switch SW1. On the other hand, the output signals of the microphone 11 responding to the changes in the sound pressure in the ear canal are applied, as inputs, to an oscillator 15 through an amplifier 17' and a switch SW2. The output signals from the amplifier 17' are applied to an integrator 18 through a band-pass filter 16 which allows the output signals in the frequency band of 100–250 Hz to pass therethrough and is converted to voltages by the integrator 18 to be applied as inputs to a comparator 19. There is also applied to the comparator 19 the voltages from a reference voltage generator 20 which are to be compared with the former ones. For outputs of the comparator 19 are introduced to a switching circuit 21 which causes the switches SW1 and SW2 to be operated.

The switches SW1 and SW2 may be formed as a release switch or as a semi-conductor switching circuit including a combination of transistors and the switches.

In FIG. 4 numeral 24 represents an external auditory canal, A a receiving system, B a transmitting system and C a switch control section.

The changeover from the transmitting operation to the reciving operation and vice versa is accomplished as follows: The output voltages of the integrator 18 are applied, as inputs, to the comparator 19 in which these inputs are compared with the other predetermined reference output voltages from the reference voltage generator 20; when the output voltages from the integrator 18 are higher than those from the reference voltage generator 20, the switching circuit 21 are rendered operative so as to put the switch SW2 in an "OFF" state and the switch SW1 in an "ON" state; when the output voltages from the integrator 18 are lower than those from the reference voltage generator 20, the switching circuit 21 is rendered operative so as to put the switch SW1 in an "OFF" state and the switch SW2 in an "ON" state.

Accordingly, for example, in case the frequencies applied to the band-pass filter 16 are whithin the specific frequency band of the band-pass filter 16 (for example, in the frequency band of 100–250 Hz) the output voltages from the integrator 18 are arranged to be higher than those from the reference voltage generator 20 and in case the frequencies are over the specific frequency band of the band-pass filter 16 (for example, in the frequency band of 300 Hz) the output voltages from the integrator are arranged to be lower than those from the reference voltage generator, it will be possible that the voice transmitting system is automatically operated only when the voice sounds are uttered by the user himself.

The provision of the equalizor in the transmitting system for the purpose of improving the hearing ability of the user according to the A characterstic and the voice sound characteristic of the user makes it possible to obtain voice sounds of high clarity.

More particularly, the microphone of condenser type which is flat in the frequency band of 50–10,000 Hz is used as an earmicrophone inserted into the external auditory canal or communicated with the air in the ear canal through a commuication pipe and, after the output signals of the earmicrophone are modified by the equalizor to those corresponding to the A characteristic and the voice sound characteristic of the user, those modified output signals are applied, as inputs, to the band-pass filter which allows the low frequency components in the frequency band of 50–2,000 Hz to pass therethrough. On the other hand, the output signals of the unidirectional microphone (for example, a microphone of the condenser type which is flat in the frequency band of 50–10,000 Hz) arranged immediately before the lips of the user are applied, as inputs, to the high-pass filter which allows the high frequency components in the frequency band of 2,000–6,000 Hz to pass therethrough. The output signals from both the band-pass filter and the high-pass filter are applied, as inputs, to a level regulating section to regulate the level and, after then, they are applied, as inputs, to the oscillator to be transmitted.

Therefore, since the low frequency components of the transmitted signals ranged in the frequency band of 50–2,000 Hz are picked up from the changes in the sound pressure in the ear canal of the user, these components include few environmental noises but only the voice sounds of the user. In addition, these components inlude high a frequency band of 2,000–6,000 Hz which are picked up through the lip microphone. Accordingly, voice sounds of high quality similar to the natural voice sounds and having a clarity in consonat pronouncing can be obtained and the environmental noises included in these high frequency components can be disregarded because the normal noises include their energy concentrated in the low frequency band. Therefore, when the present invention is used for telephone service, the environmental noises included in these high frequency components can be completely desregarded because the environmental noises consist of mostly low frequency components.

EMBODIMENT 3

The third embodiment of the present invention is intended to pick up, as the voice signals, the vibrations of the external auditory canal wall at the time of uttering the voice sounds.

There will now be described a pick-up constructed as a vibration pick-up of the acceleration type according to FIGS. 5 and 6. A piezo element 25 is arranged in an earpiece 27, which is inserted into the external auditory canal 26 of the user, in such a manner that the operative direction of the piezo element 25 is substantially perpendicular to the longitudinal direction of the external auditory canal 26. Pick-up cords 28 extend outside and are connected to an amplifier (not shown). This amplifier may be provided in the earpiece 27. The earpiece 27 is formed so as to correspond to the outline of the external auditory canal and to closely contact the bone 29 for transmitting the voice sounds and is made of metal, hard synthetic resin or the like which is capable of transmitting the vibrations of the bones. The piezo element 25 having a weight 31 mounted on the front end thereof is secured in the earpiece 27 by means of springs 30.

Figure 7:
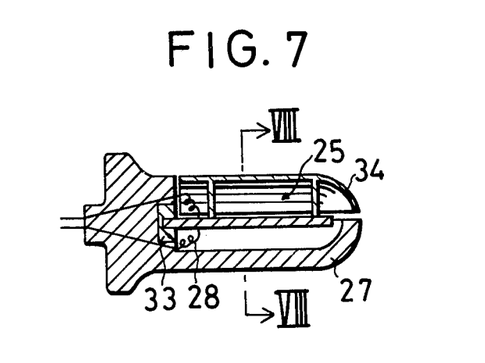
FIGS. 7 and 9 are sections showing modifications of a pick-up according to a third embodiment of the present invention.
Figure 8:
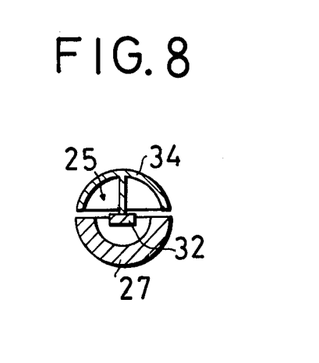
FIG. 8 is a section taken along the line VIII—VIII in FIG. 7.
Figure 9:
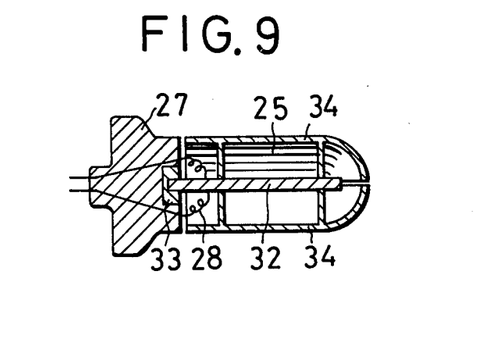

There will now be described a pick-up formed as a vibration pick-up of the displacement type. In FIGS. 7 through 9, a piezo element 32 is fixed by a supporting member 33 at the base thereof, said supporting member 33 being provided in an earpiece 27 which is made of soft synthetic resin such as silicone resin or rubber having difficulty in transmitting the vibration, and to the front end of the earpiece 27 is attached a vibration transmitting member 34 contact closely contacts the external auditory canal wall and which composes a part of the earpiece 27. The vibration transmitting member 34 may be provided at both sides of the piezo element as shown in FIG. 9.

Figure 5:
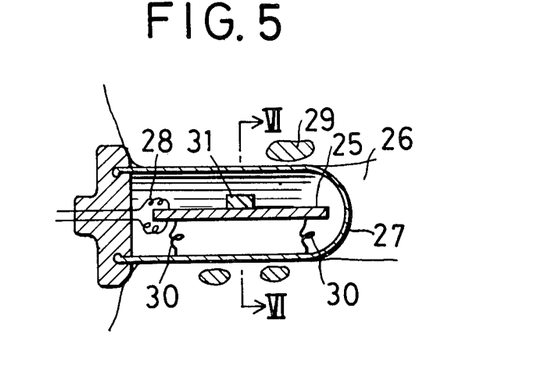
FIG. 5 is a section showing a pick-up of the acceleration type which is a third embodiment of the present invention.
Figure 6:
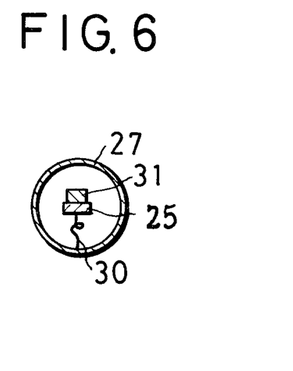
FIG. 6 is a section taken along the line IV—IV in FIG. 5.

In the embodiment shown in FIGS. 5 and 6 the earpiece 27 is inserted into the external auditory canal 26. When the user utters voice sounds, they reach the voice sounds transmitting bones to vibrate the external auditory canal. The weight 31 adds to the piezo element 25 a force proportional to the acceleration speed of the vibration to generate a voltage proportional to the force added to the piezo element and the voltage is amplified by the amplifier connected through the pick-up cords 28 to be transmitted outside.

The embodiment shown in FIGS. 7 and 9 is used and operated similar to that shown in FIGS. 5 and 6, wherein the vibration is applied to the piezo element 32 through the vibration transmitting member 34.

In the pick-up shown in FIGS. 7 through 9 the amplifier may be arranged in the earpiece or the transmitting means may be provided in the earpiece. The air-coupled earphone may be arranged in the earpiece or may be connected integral with the earpiece, permitting an interactional communication to be attained.

The present invention has been described with reference to the pick-ups of the acceleration type arranged to use the piezo element and of a modification thereof. Other pick-ups which can be used in the present invention are as follows:

(1) Magnetic type: Contrary to the speaker, a coil is placed in the magnetic field and vibrated so as to generate current responding to the vibration of the coil. The ones belonging to this type are a moving coil type, a moving magnet type, an induced magnet type, a moving iron type and a variable reluctance type. The moving coil type is arranged so that the vibration of the vibration transmitting member contacted with the external suditory canal wall is transmitted to the coil to generate a voltage. The moving magnet type is arranged so that the coil is fixed and the magnet is vibrated. The induced magnet type is a modification of the moving magnet type and is arranged so that both of the magnet and the coil are fixed and iron strip is vibrated integral with the vibration transmitting members so as to change the magnetic force across the coil. The moving iron type is a modification of the induced magnet type. The variable reluctance type is so arranged that the vibration transmitting member is placed in the magnetic field so as to change the magnetic field by the vibration of the member and to cause the coil near the field to generate current.

(2) Piezo element type: Except the above-mentioned ceramic types there can be used two piezo elements of the crystal type using potassium sodium tartrate.

(3) Electret condenser type: This is same in principle as that of the condenser type, but an electret elecrified semi-permanently when once charged can be used in the form of a combination with the equalizer in the present invention.

(4) IC type: A cartridge including an IC circuit is arranged in the earpiece. The method of generating current in this IC type is the same as that of the ceramic types.

(5) Semi-conductor type: Instead of the piezo element described in the above-mentioned embodiments there is used a silicone semi-conductor. To the silicone semi-conductor is added pressure and the change in the resistance value in the semi-conductor is derived outside through the pick-up cords.

When the piezo element is arranged in the earpiece in the present invention, it is necessary that the operative direction of the piezo element is substantially perpendicular to the direction at which the external auditory canal is extending.

Figure 10:
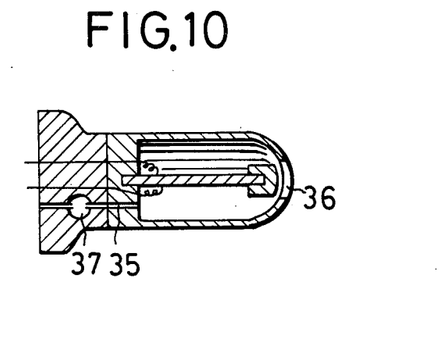
FIG. 10 is a section showing another example of the pick-up of acceleration type.

It is not necessary that the space in the external auditory canal is blocked from the outside by means of the earpiece and it is rather desirable that air escaping aperture 35 and 36 are provided in the earpiece as shown in FIG. 10 so as to allow the air in the space in the external auditory canal to escape and to reduce the effect of blocking the external auditory canal.

It is further desirable that the air escaping aperture 35 is constructed in such a manner that the sounds from the outside can be blocked and reduced. Namely, a sound absorbing material may be attached along the aperture or an expansion chamber 37 may be provided in the way of the aperture so as to reduce the energy included in the environmental noises and to efface the noises of low frequency band in the chamber, or a combination of the sound absorbing material and the expansion chamber may be used so as to efface the noises of all frequency bands.

EMBODIMENT 4

Figure 11:
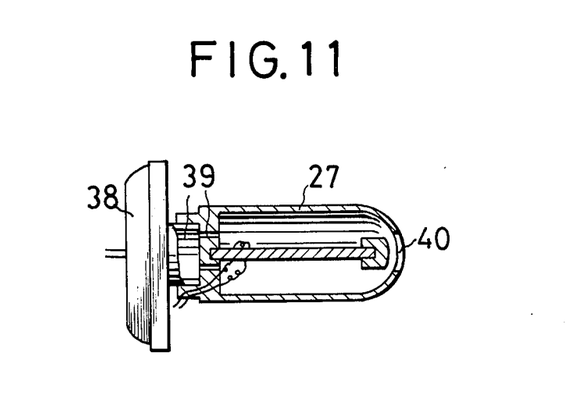
FIG. 11 is a section showing a fourth embodiment of the present invention.

The fourth embodiment is a combination of a speaker and the vibration pick-up which was described in the third embodiment. As shown in FIG. 11, an earpiece 27 is combined with an earphone, which include a speaker therein and which is in communication with the hollow space of the earpiece through aperture 39. The hollow space in the earpiece is further in communication with the space in the external auditory canal through a broken-away portion 40 provided at the front end of the earpiece. Any speakers constructed to be of the air-coupled type can be used in the present invention, but it is desirable that it is made to block the vibration of the vibration plate of the speaker from the piezo element. Alternately, the speaker may be located at any place in the air escaping passage 35 shown in FIG. 10.

EMBODIMENT 5

Figure 12:
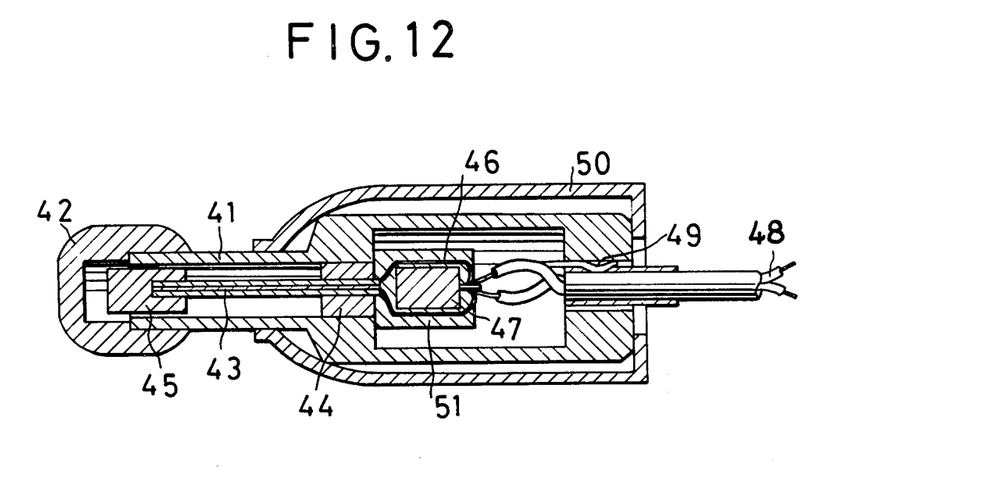
FIG. 12 is an enlarged section showing a fifth embodiment of the present invention.

There will be now described a further improved vibration pick-up according to FIG. 12. In FIG. 12 numeral 41 represents a cylindrical vibration transmitting member made of metal or other material capable of transmitting vibration, 42 a head portion for picking up the vibration transmitted through the bones in the external auditory canal, said head portion being attached to the end of the vibration transmitting member 41 and disposed in the external auditory canal wall, 43 a piezo element secured in the vibration transmitting member 41 through a supporting member 44 made of a material capable of transmitting the vibration, 45 a weight fixed to the front end of the piezo element, 46 lead lines, 47 an impedance transformer circuit, 48 a cord, 49 a metal earth, 50 a cover made of synthetic resin or rubber and 51 a mold element.

The characteristic of the piezo element 43 has a relation to the vibration direction thereof and therefore some consideration must be paid to the characteristic. It has been found that this piezo element has the following disadvantages because of its arrangement comprising a piezo crystal plate of zirconic acid and titanium acid lead sandwiched between two plates of ceramic or the like.

Namely, the results obtained by measuring the outputs of the earmicrophone by means of a vibration accelerator showed that there was a difference of about 8 dB in the vibration amplitudes when comparing the case where the piezo crystal plate was arranged perpendicular to the external auditory canal wall with the case where it was arranged horizontal to the external auditory canal wall. This means that the vibration amplitude of the piezo crystal plate is different depending on the direction at which the plate is inserted into the external auditory canal and what portion of the external auditory canal wall vibrates. Therefore, it has been found that the voice signals transmitted through the bones can not be picked up by the uniform vibration amplitude of the piezo crystal plate.

Figure 13:
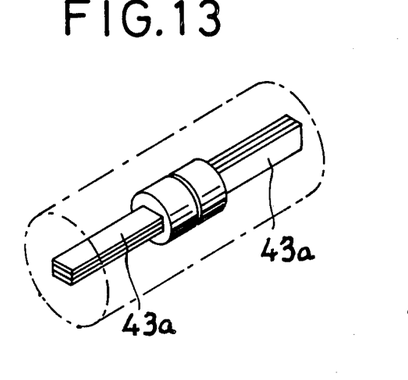
FIGS. 13 and 14 are elarged isometric views showing how the piezo elements are located.
Figure 14:
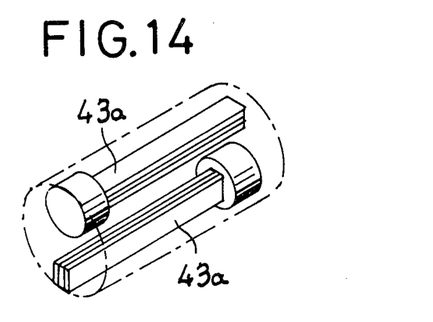
Figure 15:
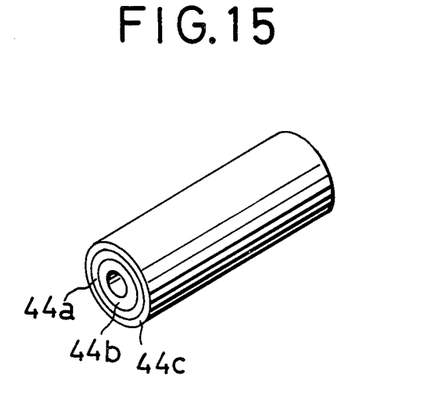
FIG. 15 is an elarged isometric view showing another example of the piezo element.

According to studies conducted, it has been clarified that the voice signals (or the vibrations) of the user are transmitted through the side head bones to the external auditory canal wall and that the portion of the external auditory canal wall to which the voice signals are transmitted is generally located, in a case of an adult, at a depth of 10cm from the entrance of the external auditory canal where the bones capable of transmitting the vibrations transmitted through the side head bones are present. Therefore, the portion of the external auditory canal wall to which the voice signals are transmitted through the bones are different according to every individual and the pick-up sensitivity sometimes become worse depending on the direction at which the piezo crystal plate in the earmicrophone is inserted into the external auditory crystal. Accordingly, in the embodiment shown in FIG. 12 there is used the same piezo element as those already described, but the characteristic of the piezo element which is influenced by the direction at which the vibration pick-up is inserted into the external auditory canal is improved by using plural piezo elements 43a and 43a which are different in the angles at which they are arranged as shown in FIGS. 13 and 14, or there is used a piezo element comprising a piezo crystal such as zirconic acid titanium acid lead into a ring shape and covering the outer and the inner surfaces of the ring-shaped piezo crystal 44a directly or through a reinforcing metal with polarization members 44b and 44c such as ceramic material.

The function of the piezo element used in this embodiment is the same as those of the embodiments already discribed.

EMBODIMENT 6

Figure 16:
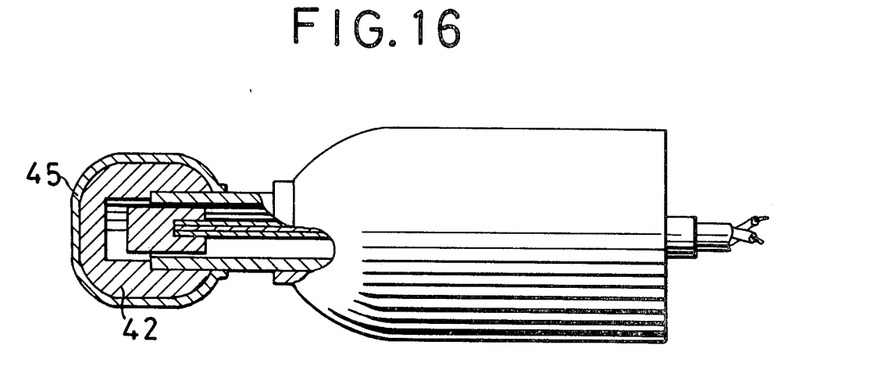
FIG. 16 is an enlarged view, partly sectioned, showing a sixth embodiment of the present invention.
Figure 17:
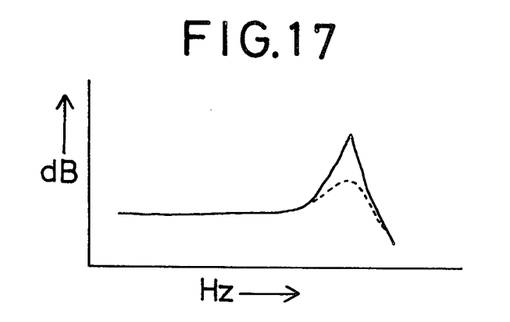
FIG. 17 is a graph showing the frequency characteristic of the embodiment in FIG. 16.
Figure 18:
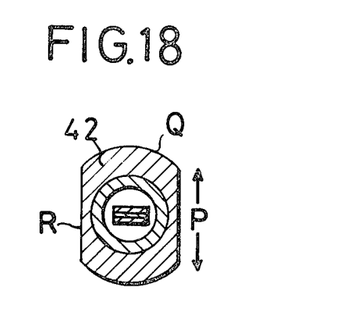
FIG. 18 is an enlarged section showing the head portion of the vibration pick-up.
Figure 19:
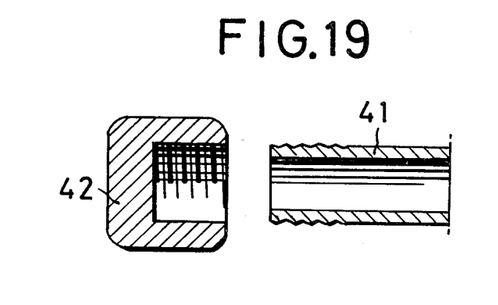
FIGS. 19 through 22 are enlarged sections showing some modifications of the head portion of the vibration pick-up.
Figure 20:
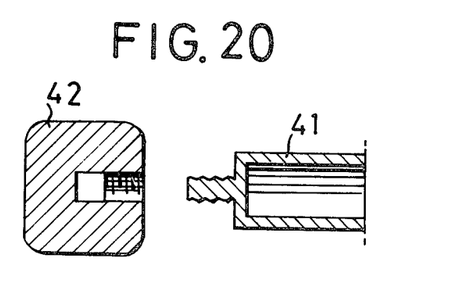
Figure 21:
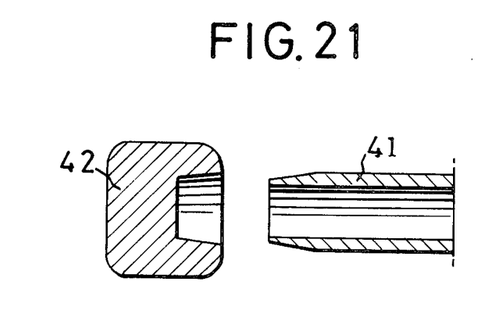
Figure 22:
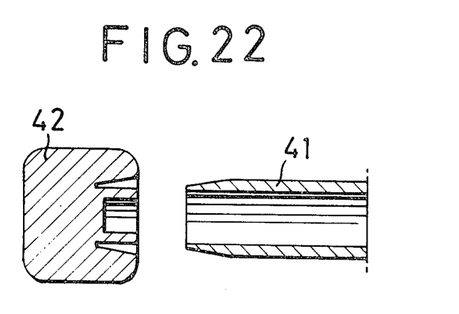

This embodiment is intended to lower the peak of the frequency characteristic of the microphone used in the external auditory canal and to obtain the voice signals of high clarity through the bone in the external auditory canal. As shown in FIG. 16, a head portion 42 disposed in the external auditory canal wall is arranged to be covered by dumper member 45 made of rubber, soft synthetic resin or the like. When the dumper member 45 is present between the head section 42 and the external auditory canal wall, the peak of the frequency characteristic of the microphone is lowered and modified as shown in dotted line in FIG. 17, thus permitting the voice sounds (vibrations) of high clarity through the bones to be picked up. The head section 42 in FIG. 18 is partly broken away in such a manner that the sensing outer peripheries Q of the head portion in the same direction as the sensing direction (P direction) of the piezo element are urged to the external auditory canal wall. Namely, the other outer periphries R of the head portion corresponding to the non-sensing direction of the element are arranged not to be contacted or to be contacted with the external auditory canal wall more lightly than the sensing outer peripheries. The shape of this sensing portion may be formed as a cylindrical one partly broken away, or two sensing portions being circular in their ends may be projected in the same direction as the sensing one of the element or other forms may be considered.

EMBODIMENT 7

As shown in FIGS. 19 through 22, this embodiment is intended to function as a microphone wherein plural head portions 42 different in their outer diameter having a connection means with a vibration transmitting member 41, respectively, are arranged to be detachable from the vibration transmitting member and therefore even if the inner diameters of the external auditory canals of the users are different, the vibration of the external auditory canall wall can always be picked up so as to attain an excellent pick-up effect.

EMBODIMENT 8

Figures 23, 24, 25:
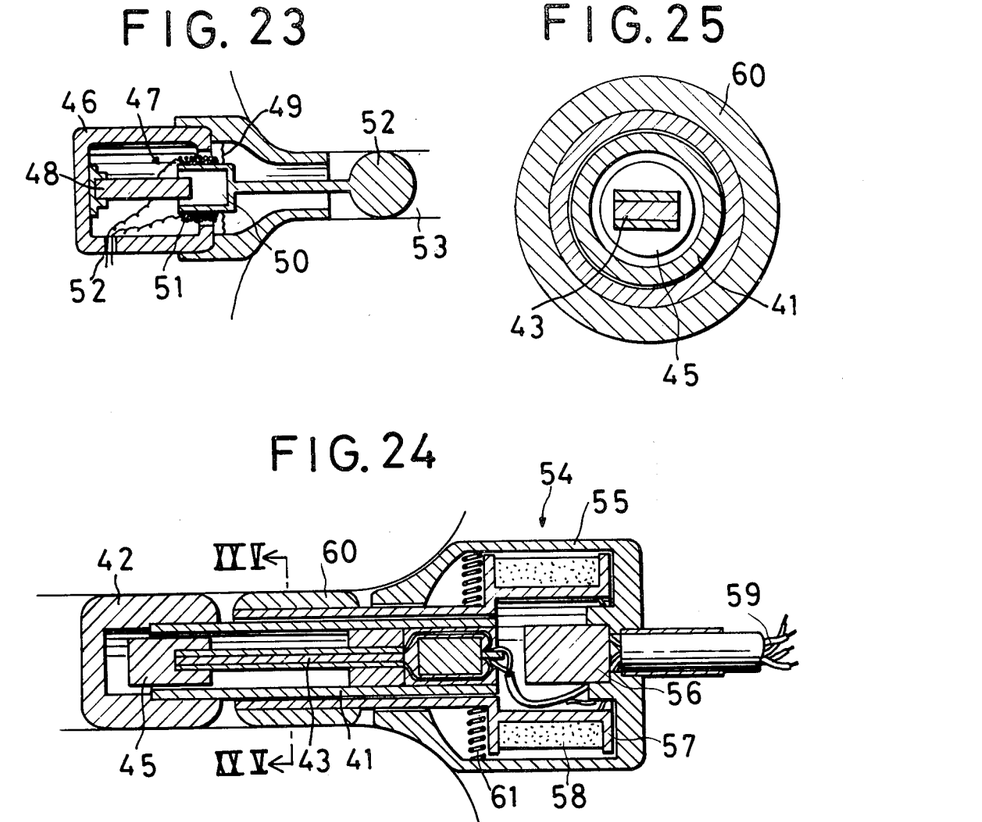
FIG. 23 is a section showing an eighth embodiment of the present invention.
FIGS. 24 and 26 are enlarged sections showing a ninth embodiment of the present invention.
FIG. 25 is an enlarged section taken along the line XXIV—XXIV in FIG. 24.

This embodiment shown in FIG. 23 is a receiver of the bone conductive type or a hearing aid arranged to transmit the vibrations direct to the bones of the head.

In FIG. 23 there is provided in a case body 46 and a transducer 47 for converting the voice sounds to mechanical vibrations. The transducer 47 comprises a magnet 48, an iron core 50 located opposite to the magnet 48 and supported by a dumper 49, a coil 51 wound around the iron core 50 in series and lead lines 52a connected to the coil 51 and supplying the voice signal from the outside. The voice signal supplied to the coil 51 render the iron core 50 excited. In this embodiment there is provided a a vibration element 52 of the magnetic type which responds to the action of the magnetic field in the iron core 50 and the vibraions are transmitted to the external auditory canal wall by inserting the vibration element into the external auditory canal to closely contact the external auditory canal wall. It may be arranged that an aperture is provided in the body 46 so as to allow the vibration element 52 to be freely vibrated and to enhance the vibration reliability of the vibration element. Further, the vibration element 52 may be provided with an air escaping aperture for preventing the effect of the external auditory canal blockage.

EMBODIMENT 9

The embodiment shown in FIGS. 24 and 25 is a combination of a transmitting system and a receiving system, said transmitting system including a transducer for converting the sound signals to the vibrations such as a piezo element or the like provide in a vibration transmitting member which is urged to a portion of the user and to which the voice signals are transmitted through the bones of the user, and receiving system including a transducer for converting the sound signals received from the outside to the mechanical vibrations and a vibration transmitting member for transmitting the vibrations from the transducer to a portion of the user.

In FIGS. 24 and 25 numeral 54 represents a transducer for converting the sound signals into the vibrations, said transducer comprising a magnet 56 fixed to a case body 55, an iron core 57 arranged opposite to the magnet, and a coil 58 wound around the iron core. In this case the iron core may be fixed while the magnet is movable. Numeral 59 represents wires which are connected to the coil 58 and supply the sound signals from the outside. There is provided a vibration transmitting member 60 consisting of the vibration element of the magnetic type which reponds to the magnetic field generated in the iron core 57 and said member 60 is arranged to closely contact the external auditory canal wall. In the Figures numeral 61 denotes a dumper. The transducer for converting the vibrations to the sound signals used in the transmitting system has the same arrangement as that of the vibration pick-up.

Figure 26:
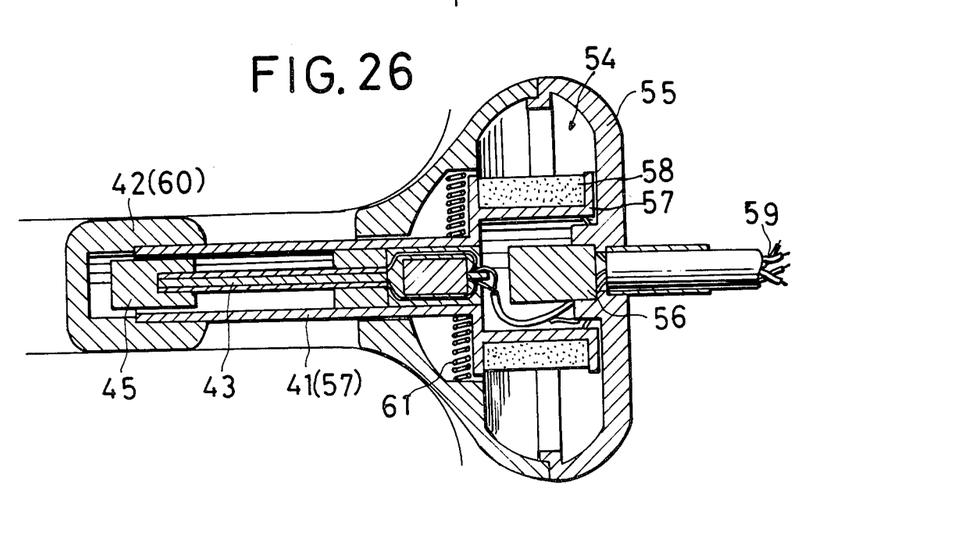

The embodiment as shown in FIG. 26 serves to function as the vibration transmitting member in the transmitting system and the vibration transmitting member (or vibration element) in the receiving system and the members shown in FIG. 26 are denoted by same numerals as those in FIGS. 24 and 25.

EMBODIMENT 10

Figure 27:
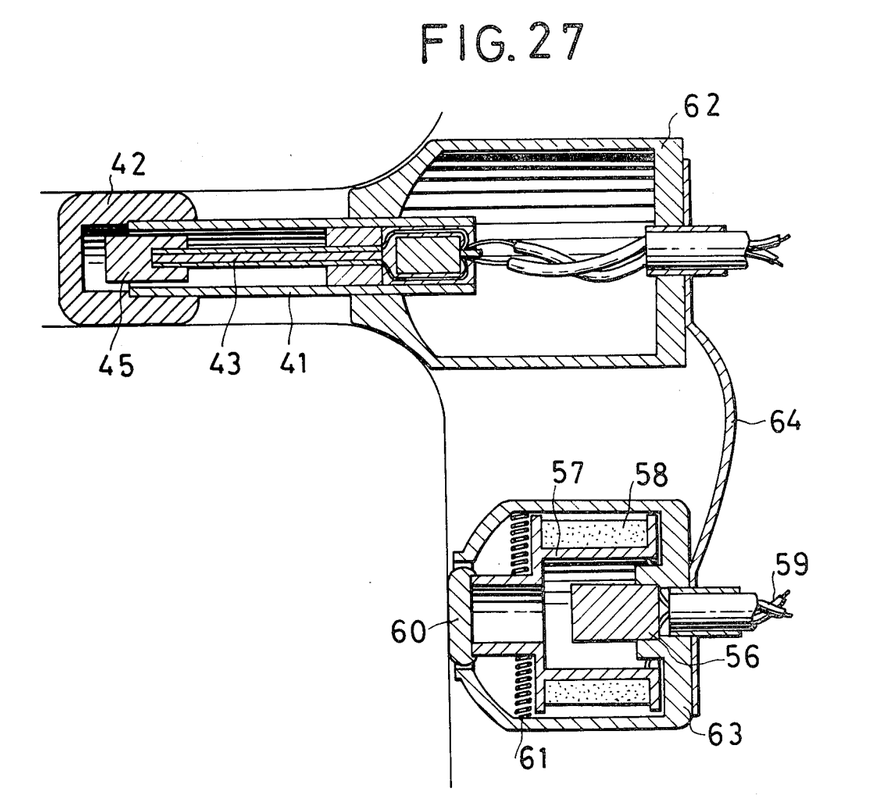
FIG. 27 is an enlarged section showing a tenth embodiment of the present invention.

This embodiment shown in FIG. 27 is arranged so that the transmitting system is located in the external auditory canal and the receiving system is attached to a portion near the ear, for example, the mastoid cell behind the auricle, the cheekbone or the jaw. The connection portion 64 between the case 62 including the transmitting system and the case 63 including the receiving system is arranged to have resiliency and the same numerals are used in FIG. 27 as those in the embodiment already described.

EMBODIMENT 11

Figure 28:
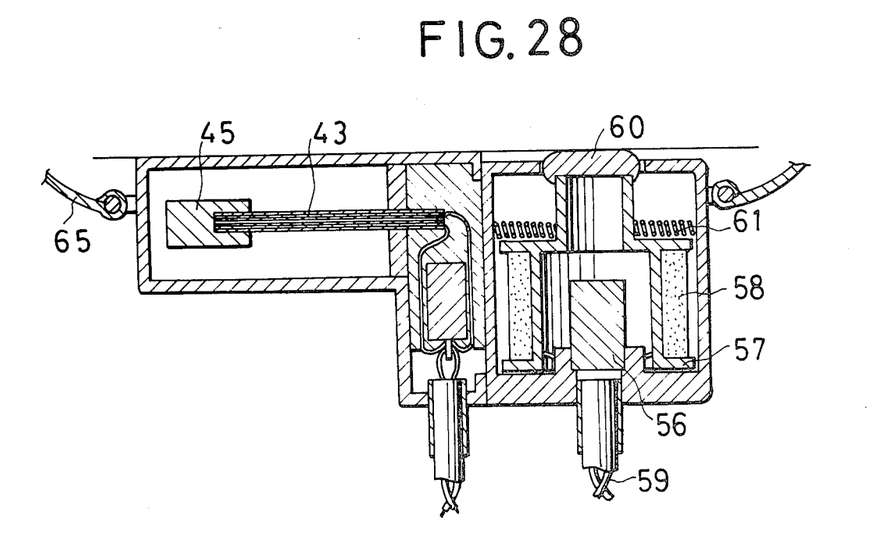
FIG. 28 is an enlarged section showing an eleventh embodiment of the present invention.

The embodiment shown in FIG. 28 is so arranged that the voice sounds transmitting and receiving means are attached to a portion of the user capable of transmitting the sound signals through the bones thereof, for example, the forehead, the throat, the nose bridge, the auricle, the cheekbones, the jaw or the back of the head, by means of a band 65. There are used in FIG. 28 same numerals as those in the embodiments of 9 and 10.

In the embodiments shown in FIGS. 9 through 11 the equalizer, the amplifier, the power source, the transmitter and the receiver may be contained for a case in both of the transmitting and the receiving systems or in another form of case capable of being contained in a pocket of the user.

The embodiments shown in FIG. 9 through 11 having the arrangement as described above will be described. The function of the transmitting system is the same as already described. On the other hand, the function of the receiving system is that the voice signals (or sound signals) transmitted from the outside are supplied through cords 59 to coils 58 to excite an iron core 57 and are converted to the mechanical vibrations and transmitted through a vibration transmitting member 60 to a portion of the user capable of transmitting the vibrations.

In the embodiments already described above both the transmitting and the recerving systems employ the bone conductive method, so that it is desirable to put the system in an "OFF" state while the other system is operating. The step for attaining such object is to operate the changeover switch by hand or to provide for an automatic changeover by the method as shown in FIG. 4.

EMBODIMENT 12

Figure 29:
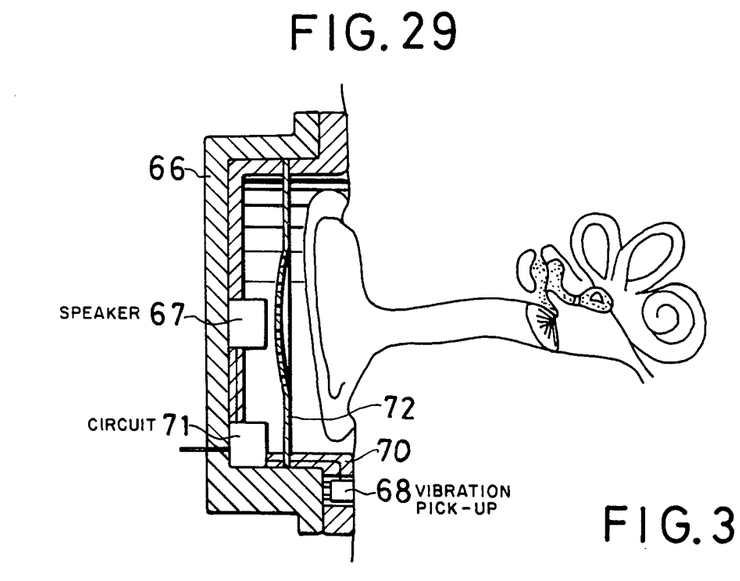
FIG. 29 is a section thereof and FIGS. 30 and 31 are front views showing an ear muff.
Figure 30:
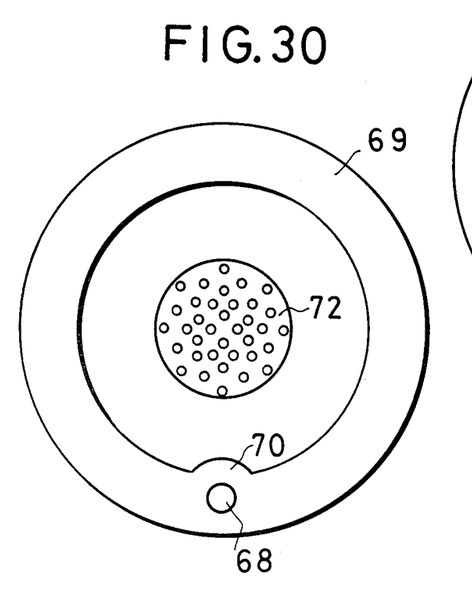
Figure 31:
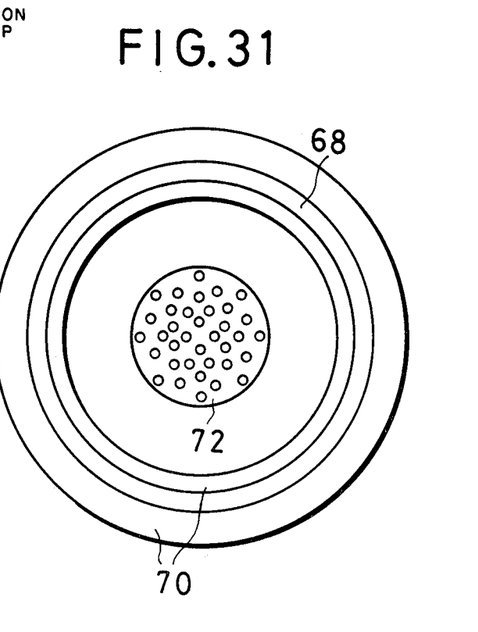

This embodiment is a combination of an air-coupled speaker and a vibration pick-up as shown in FIGS. 29 through 31.

Numeral 66 represents a soundproof ear muff, 67 a speaker of the air conductive type arranged substantially in the center of the ear muff, 68 a vibration pick-up of the bond conductive type provided in the outer periphery of the ear muff 66 closely contacted around the ear, 70 a vibration absorbing wall covering the whole portion except the transmitting portion of the pick-up, 71 an electrical circuit rendering a speaker of the air conductive type 67 and a vibration pick-up 68 of the bone conductive type. Said electrical circuit includes an amplifier and sometimes a transmitting and a receiving means.

In this embodiment the air conductive speaker 67 is desirably arranged in the center of the ear muff as in conventional headphones and covered with a plate 72 provided with a plurality of apertures. It is also desirable that the vibration pick-up of the bone conductive type 68 is arranged in a portion of or the whole portion of the outer periphery of the ear muff so as to contact around the auricle. The vibration absorbing wall 70 functions to prevent the propagation of vibration between the earphone 67 of the air conductive type and the vibration pick-up 68 of the bone conductive type and covers the vibration pick-up of the bone conductive type as shown in the Figures.

The embodiment the arrangement as described above, so that when the ear muff 66 is secured to an ear as a conventional headphone, the speaker 67 of the air conductive type faces the ear canal and the vibration pick-up 68 of the bone conductive type contacts the bones around the auricle, thus allowing the sounds received from the outside to be heard through the speaker 67 of the air conductive type and the voice sounds uttered by the user to be transmitted outside through the vibration pick-up of the bone conductive type.

As the vibration pick-up of the bone conductive type there can be employed the vibration pick-up of the acceleration type, the bar-shaped or the tape-shaped vibration pick-up using the piezo element or the like.

EMBODIMENT 13

Figure 32:
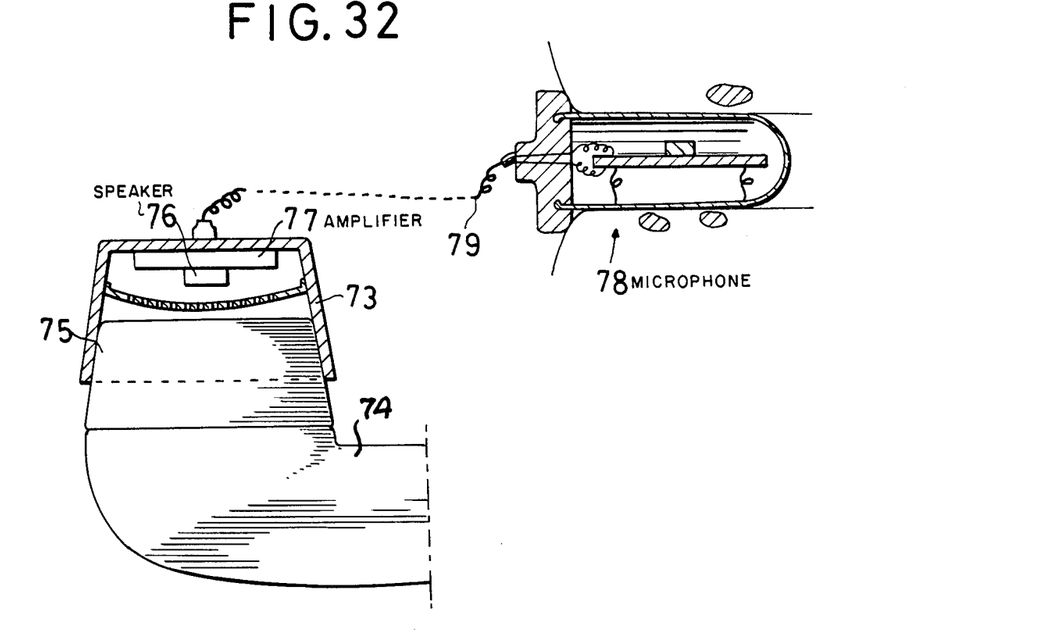
FIGS. 32 and 33 are partly enlarged sections showing a thirteenth embodiment.

This embodiment as shown in FIG. 32 is arranged so that the vibration pick-up of the present invention is used as a means for assisting the voice sounds transmission through a telephone.

In FIG. 32 numeral 73 represents a soundproofing cap covering the voice sound transmitting portion 75 of the transmitting and receiving section 74 of a telephone, 76 a speaker provided in the cap and 77 an amplifier. Numeral 78 denotes a microphone inserted into the external auditory canal and said microphone is connected to the speaker 76 in the soundproofing cap through a cord 79.

As this microphone there can be used either a microphone of the vibration pick-up type which is intended to pick up the bone conductive voice signals (or vibrations) through the external auditory canal wall as shown in FIG. 32 or a microphone of the air conductive type which is intended to pick up the voice sounds from the changes in the sound pressure in the external auditory canal.

Figure 33:
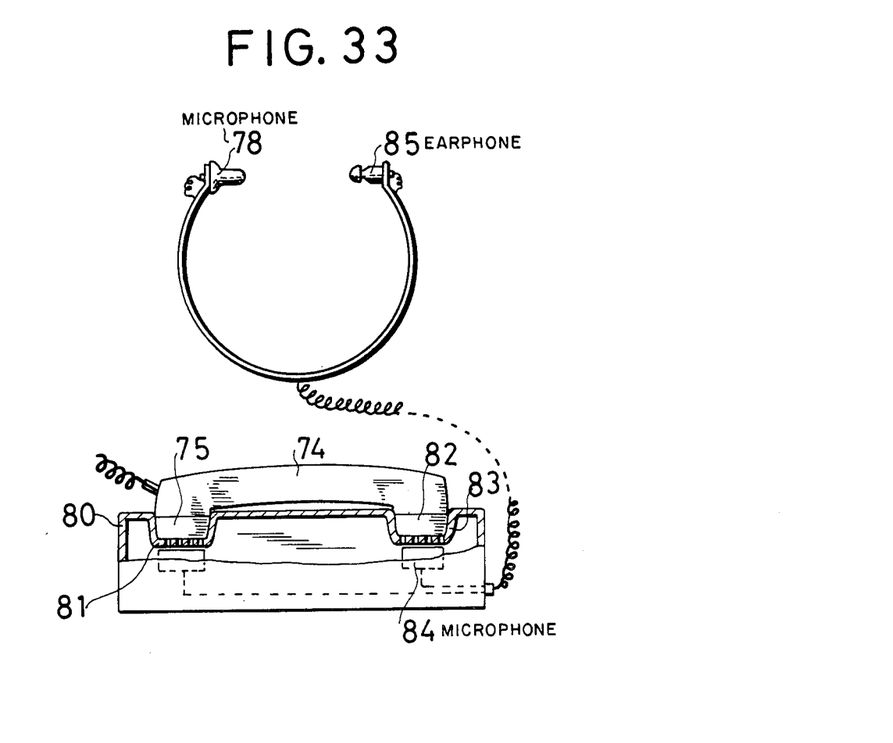

FIG. 33 shows an embodiment of the present invention used as a means for assisting the voice sounds transmission and reception through the telephone. A soundproofing cap is formed as a box 80 having a pair of sound proofing recess portions 81 and 83 into which the voice sound transmitting and the receiving portions of the telephone are inserted, respectively. The means is used in such a manner that the microphone 78 is inserted into one ear and the earphone 85 connected to the microphone 84 arranged in the recess portion 83 is inserted into the other ear.

EMBODIMENT 14

This embodiment relates to a means for assisting the voice sounds reception through the telephone capable of making it easy to receive the voice sounds under a noisy environment and to help a person who is weak of hearing and who has some defects in his hearing ability to receive the voice sounds through the telephone.

Figure 34:
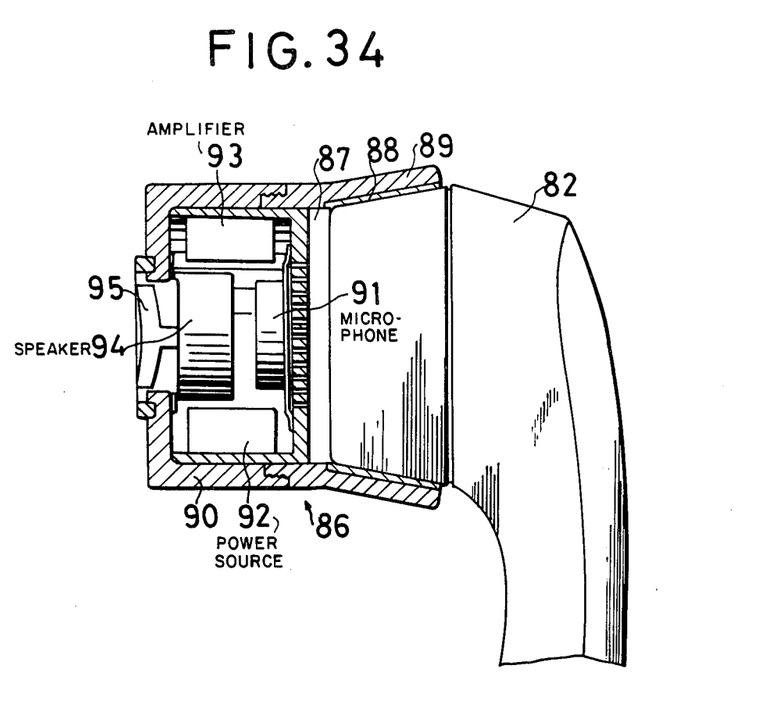
FIG. 34 is a section showing a fourteenth embodiment of the present invention.

In FIG. 34 numeral 82 represents a telephone receiver and 86 a means for assisting the voice sound reception through the telephone receiver. The means 86 has a trapezoidal opening 87 whose inner surface is covered with a nonskid member 88 to form an attachment 89 and into which the telephone receiver 82 is inserted. A frame 90 connected to this attachment 89 through a screw thread contains therein a microphone 91, a power source 92, an amplifier 93 and a vibration type speaker 94. Particularly, the end portion 95 of the vibration element of the speaker of the bone conductive type is different in shape in the case where it is contacted closely with the head side or the like and in the case where it is inserted into the external auditory canal, but either one can be used in the present invention.

There will be now described the function of the means for assisting the voice sounds receiving means through the telephone.

The means 86 is capped onto the voice sounds receiving portion of the telephone receiver 82. When the speaker in the voice sounds receiving portion is operated, the microphone 91 in the means 86 picks up the voice signals and after the voice signals are amplified by the amplifier 93, they are introduced to the speaker of the vibration type so as to vibrate the vibration element therein. At this time, if the telephone receiver 82 is held by a hand of the user in such a manner that the vibration element 95 is closely contacted with the head side, the vibrations of the vibration element 95 reaches the auditory nerve of the internal auditory canal through the bones in the head side, thus allowing the person who has a defect in the hearing ability to hear the voice sounds.

The embodiment can be formed into the following arrangements:

1. The member for attaching to the telephone receiver the means for assisting the voice sounds reception is made of a rubber band, a vacuum adhesion disc or the like.

2. The means for assisting the voice sounds reception of the telephone receiver and the speaker of the vibration type are formed as individual means and connected with each other through a lead line of proper length.

3. The attachment 89 is provided with a plurality of apertures through which the sounds through the speaker the air conductive type of the telephone receiver are allowed to be introduced into the ear canal.

4. The speaker is the one of the air conductive type and includes the ones capable of being regulated in their volume and is an earphone connected with the microphone through means of a lead line of proper length.

5. At the place where the air vibration is used with difficulty, for example, in a vacuum or in water it is used as a telephone.

EMBODIMENT 15

This embodiment is a means for assisting the voice utterance ability wherein the vibration pick-up of the present invention is used.

Figure 35:
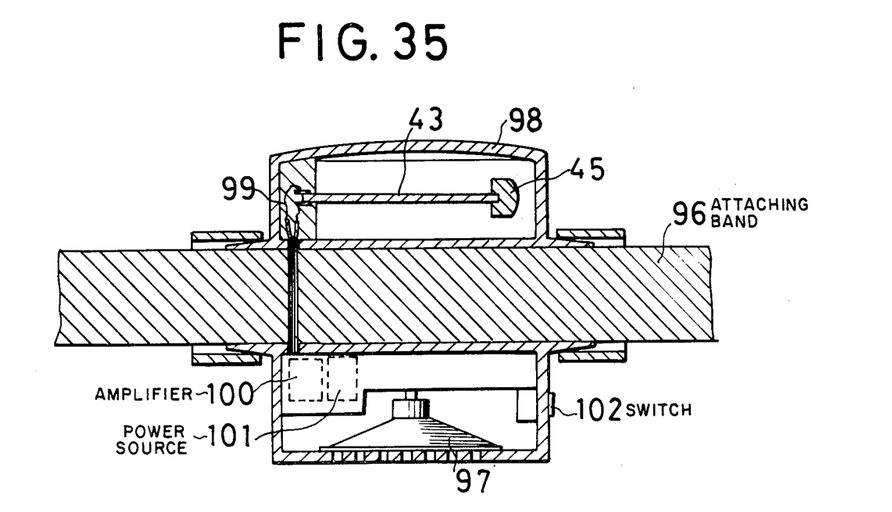
FIG. 35 is an enlarged section showing a fifteenth embodiment of the present invention.

The means shown in FIG. 35 is attached to the throat, the jaw the forehead, the breast or the like of the user and has an attching band 96. In the back portion of the means is provided the vibration pick-up as described above which is urged to a portion of the user capable of transmitting the voice signal through the bones and at the first portion of the means is provided a speaker 97. The vibration pick-up comprises a piezo element 43 (for example, zilcone acid titanium acid ceramic) contained in a case made of a member capable of effectively transmitting the vibration, said piezo element having a weight. In FIG. 35 numeral 99 represents a pick-up cord, 100 an amplifier, 101 a power source and 102 a switch.

As described above, the voice sounds transmitting and receiving apparatus allows the voice sounds transmitting and receiving operation to be attained under noisy environments. When the apparatus is practically used, it is desirable from the view point of safety that one of the ears of the user is kept open. The apparatus of the present invention allows the user to freely move and do any work without feeling discomfort. Further, the microphone and the speaker incorporated in the apparatus can be formed as mini-sized ones, so that the apparatus can be used as a useful means in other circumstances. Namely, the apparatus can be used as an auxiliary means for assisting the person who has a defect of his sound utterance and hearing ability to utter and hear the sound. Moreover. when the external auditory canal microphone and the bone conductive speaker are incorporated in a fire fighting mask, a diving suit, a gas mask or the others, communication of high clarity can be accomplished because the vibration in the air outside the human body is not used.

What is claimed is:

1. A voice sound transmitting and receiving apparatus comprising an earpiece means adapted to be inserted in the auditory canal of a user to contact the bones of a user within the ear to use bone conductive voice vibrations, said earpiece means having a hollow portion, converting means in said hollow portion operable to convert bone conductive voice vibrations to electrical signals and vice versa, said converting means comprising a piezo element in the form of a strip arranged in said hollow portion in said earpiece means, a space portion in the earpiece means to communicate with the air in the space of the external auditory canal, and a speaker in said space portion.

2. A voice sound transmitting and receiving apparatus comprising an earpiece means adapted to contact the bones of a user within the ear to use bone conductive voice vibrations, said earpiece means having a hollow portion, converting means in said hollow portion operable to convert bone conductive voice vibrations to electrical signals and vice versa, said converting means comprising a piezo element in the form of a strip arranged in said hollow portion in said earpiece means, and a weight fixed on the piezo element.

3. A voice sound transmitting and receiving apparatus comprising an earpiece means adapted to contact the bones of a user within the ear to use bone conductive voice vibrations, said earpiece means having a hollow portion, and converting means in said hollow portion operable to convert bone conductive voice vibrations to electrical signals and vice versa, said converting means comprising a pluarlity of piezo elements in strip form arranged in said hollow portion in such different directions that the piezo effect of respective piezo crystals and the bone conductive voice signals can be picked up without being influenced by the difference in the vibration amplitudes of the piezo elements which may be caused from the directional property of respective piezo crystals.

4. A voice sound transmitting and receiving apparatus comprising an earpiece means adapted to contact the bones of a user within the ear to use bone conductive voice vibrations, said earpiece means having a hollow portion, and converting means in said hollow portion operable to convert bone conductive voice vibrations to electrical signals and vice versa, said converting means comprising a piezo element in the form of a strip arranged in said hollow portion in said earpiece means, said piezo element comprising a piezo crystal of zirconic acid titanium acid lead in ring form with the outer and the inner surfaces of the ring-shaped piezo crystal being covered by a polarization material so that the bones conductive voice signals can be picked up without being influenced by the difference in the vibration amplitude of the piezo element which may be caused from the directional property of the piezo crystal.

5. A voice sound transmitting and receiving apparatus according to claim 4 wherein said polarization material is ceramic.

* * * * *